(12) United States Patent
Bronczyk et al.

(10) Patent No.: US 8,311,778 B2
(45) Date of Patent: Nov. 13, 2012

(54) INDUSTRIAL PROCESS CONTROL TRANSMITTER WITH MULTIPLE SENSORS

(75) Inventors: Andrew J. Bronczyk, Chanhassen, MN (US); Charles E. Goetzinger, Chanhassen, MN (US); Jason H. Rud, Mayer, MN (US); Clarence E. Holmstadt, Chaska, MN (US); Douglas W. Arntson, Maple Grove, MN (US)

(73) Assignee: Rosemount Inc., Eden Prairie, MN (US)

( * ) Notice: Subject to any disclaimer, the term of this patent is extended or adjusted under 35 U.S.C. 154(b) by 270 days.

(21) Appl. No.: 12/786,806

(22) Filed: May 25, 2010

(65) Prior Publication Data

US 2011/0071794 A1    Mar. 24, 2011

Related U.S. Application Data

(60) Provisional application No. 61/244,609, filed on Sep. 22, 2009.

(51) Int. Cl.
*G06F 15/00* (2006.01)

(52) U.S. Cl. .............. 702/188; 702/57; 702/58; 700/47; 700/48; 700/49; 700/50

(58) Field of Classification Search .................... 702/57, 702/58, 64, 182, 183, 185, 188; 700/47–50, 700/292, 297, 298; 370/216, 241
See application file for complete search history.

(56) References Cited

U.S. PATENT DOCUMENTS

| 4,122,719 A | 10/1978 | Carlson et al. |
|---|---|---|
| 4,243,931 A | 1/1981 | Dela Cruz |
| 4,413,314 A | 11/1983 | Slater et al. |
| 4,678,937 A | 7/1987 | Price |
| 4,910,658 A | 3/1990 | Dudash et al. |
| 4,936,690 A | 6/1990 | Goetzinger |
| 5,307,346 A | 4/1994 | Fieldhouse |
| 5,495,769 A | 3/1996 | Broden et al. |
| 5,551,053 A | 8/1996 | Nadolski et al. |
| 5,706,007 A | 1/1998 | Fragnito et al. |
| 5,713,668 A | 2/1998 | Lunghofer et al. |
| 5,737,543 A | 4/1998 | Gavin et al. |

(Continued)

FOREIGN PATENT DOCUMENTS

DE    34 366 844 A1    4/1986

(Continued)

OTHER PUBLICATIONS

Search Report and Written Opinion from corresponding Application No. PCT/US2010/049071, dated Dec. 1, 2010.

(Continued)

*Primary Examiner* — Sujoy Kundu
(74) *Attorney, Agent, or Firm* — Westman, Champlin & Kelly, P.A.

(57) ABSTRACT

An industrial process control transmitter includes a first input configured to couple to a first sensor, and a second input configured to couple to a second sensor. Measurement circuitry is configured to couple to the first and second sensors and provide an output related to a sensed process variable. A multiplexer is configured to selectively couple the first and second sensors to the measurement circuitry. An equalizer circuit is coupled to the first and second sensors and configured to equalize a voltage potential between the first sensor and the measurement circuitry.

24 Claims, 3 Drawing Sheets

U.S. PATENT DOCUMENTS

| | | | |
|---|---|---|---|
| 5,825,664 | A | 10/1998 | Warrior et al. |
| 5,876,122 | A | 3/1999 | Eryurek |
| 5,960,214 | A | 9/1999 | Sharpe et al. |
| 5,980,078 | A | 11/1999 | Krivoshein et al. |
| 6,014,612 | A | 1/2000 | Larson et al. |
| 6,016,523 | A | 1/2000 | Zimmerman et al. |
| 6,026,352 | A | 2/2000 | Burns et al. |
| 6,035,240 | A | 3/2000 | Moorehead et al. |
| 6,047,222 | A | 4/2000 | Burns et al. |
| 6,052,655 | A | 4/2000 | Kobayashi et al. |
| 6,088,665 | A | 7/2000 | Burns et al. |
| 6,094,600 | A | 7/2000 | Sharpe et al. |
| 6,104,875 | A | 8/2000 | Gallagher et al. |
| 6,192,281 | B1 | 2/2001 | Brown et al. |
| 6,574,515 | B1 | 6/2003 | Kirkpatrick et al. |
| 6,711,446 | B2 | 3/2004 | Kirkpatrick et al. |
| 6,961,624 | B2 | 11/2005 | Kirkpatrick et al. |
| 7,117,079 | B2 * | 10/2006 | Streichsbier et al. ......... 701/114 |
| 7,228,186 | B2 | 6/2007 | Karschnia et al. |
| 7,835,295 | B2 | 11/2010 | Brewer et al. |
| 7,844,365 | B2 * | 11/2010 | Brewer et al. ................. 700/270 |
| 2002/0010518 | A1 | 1/2002 | Reid et al. |
| 2006/0161271 | A1 | 7/2006 | Kirkpatrick et al. |

FOREIGN PATENT DOCUMENTS

| | | |
|---|---|---|
| DE | 29720492 U1 | 2/1998 |
| EP | 0601344 A1 | 6/1994 |
| EP | 0666631 A2 | 1/1995 |
| GB | 2329039 A | 3/1999 |
| JP | 52-108194 | 9/1977 |
| JP | 07162345 A | 6/1995 |
| WO | WO 01/88644 | 11/2001 |

OTHER PUBLICATIONS

Office Action issued by the United States Patent and Trademark Office for U.S. Appl. No. 10/400,148, dated Oct. 1, 2003, 10 pages.
Office Action issued by the United States Patent and Trademark Office for U.S. Appl. No. 09/570,268, dated Aug. 27, 2002, 13 pages.
Office Action issued by the United States Patent and Trademark Office for U.S. Appl. No. 11/210,246, dated Dec. 1, 2006, 12 pages.
D5000 Series Users Manual, 23 pages, revised Jan. 1, 1998.
"Ace pc", Arcom Control Systems, dated Feb. 23, 2000, downloaded from http://www.arcom.co.uk/products/iep/systems/ace/default.htm, 1 page.
"Smart Transmitter (HART Protocol) Interface Products", 1770 Communication Products, dated Apr. 26, 1999, from http://www.ab.com/catalogs/html/b112/io/smart.html, 2 pages.
"Transducer Interfacing Handbook", A Guide to Analog Signal Conditioning, Daniel H. Sheingold, 1980, 5 pages.
"Smart Head and Rail Mount Temperatures Transmitters", Models 644H and 644r, Fisher-Rosemount Managing the Process Better, 1998, pp. 37-52, 16 pages.
"Smart Temperature Transmitter", Models 3144 and 3244MV, Fisher-Rosemount Managing the Process Better, 1998, pp. 19-36, 18 pages.

Objections by Third Party in accordance with Article 115 EPC for EP Application No. 01 933 150.3-1239, dated Dec. 22, 2003, 30 pages.
Instruction Manual FD0-BI-Ex12.PA, German language document and apparent English equivalent, Part No. 107591, Jan. 24, 2001, 24 pages.
Universal temperature multiplexer for Foundation Fieldbus, Universal converter, analogue, F2D0-TI-Ex8.FF, 2003, 7 pages.
"Valve Coupler for Foundation Fieldbus", Manual FD0-VC-Ex4.FF, Pepperl+Fuchs, Nov. 22, 2000, 49 pages.
"PROFIBUS-PA Valve Coupler Field Box", 2002 IS Catalog, Pepperl+Fuchs, 2002, 1 page.
"PROFIBUS-PA Sensor Interface Field Box", 2002 IS Catalog, Pepperl+Fuchs, 2002, 1 page.
EC-Type Examination Certificate for FD0-VC-Ex4.PA, dated Dec. 18, 1998, German language document with apparent English translation, 15 pages.
Supplement to EC-Type Examination Certificate for FD0-VC-Ex4.Pa, dated Sep. 21, 2000, German language document with apparent English translation, 4 pages.
Supplement to EC-Type Examination Certificate for FD0-VC-Ex4.Pa, dated Sep. 18, 2000, German language document with apparent English translation, 2 pages.
First Amendment to EC-Type Examination Certificate for FD0-VC-Ex4.Pa, dated Dec. 22, 1999, German language document with apparent English translation, 8 pages.
First Chinese Office Action for Chinese Application No. 01809359.0, dated Apr. 23, 2004, 8 pages.
"Advanced Systems Simplify Control", Machine Design, Penton, Inc., vol. 68, Nr. 12, pp. 118, 120, Jul. 11, 1996, 2 total pages.
Babb, M., "Looking Around for More Work to Do", Control Engineering International, vol. 43, Nr. 14, pp. 59-60, 62, Oct. 1996, 6 total pages.
"Model 848T Eight Input Temperature Transmitter With Foundation(TM) Fieldbus", Product Data Sheet 00813-0100-4697, Mar. 2003, 15 pages.
Communication pursuant to Rules 161(1) and 162 EPC for EP Application No. 10757532.6-1239, dated May 4, 2012, 2 pages.
Second Chinese Office Action for Chinese Application No. 01809359.0, dated Dec. 10, 2004, 6 pages.
Notification of Grant of Invention Patent for Chinese Application No. 01809359.0, dated Jun. 3, 2005, 3 pages.
Communication of a Notice of Opposition for EP Application No. 01933150.3-1239, dated Aug. 2, 2011, 5 pages.
Rejection Notice for Japanese Application No. 2001-584975, dated Jan. 11, 2006, 12 pages.
Rejection Notice for Japanese Application No. 2001-584975, dated Nov. 1, 2006, 9 pages.
Final Rejection Notice for Japanese Application No. 2001-584975, dated Jul. 11, 2007, 3 pages.
Trial Decision for Japanese Appeal No. 2007-27597 for corresponding Japanese Application No. 2001-584975, dated Dec. 4, 2008, 13 pages.
First Examination Report for Indian Application No. IN/PCT/200211839/CHE, dated Jan. 24, 2006, 2 pages.

* cited by examiner

INDUSTRIAL PROCESS CONTROL TRANSMITTER WITH MULTIPLE SENSORS

The present invention claims priority to provisional patent application Ser. No. 61/244,609, filed Sep. 22, 2009, entitled "INDUSTRIAL PROCESS CONTROL TRANSMITTER WITH MULTIPLE SENSORS".

BACKGROUND OF THE INVENTION

The present invention relates to process devices. More specifically, the present invention relates to field-mounted process control and measurement devices.

Process devices are used to measure and control industrial processes such as the refining of petrochemicals, the processing of food, the generation of electric power, and a number of other processes. Process measurement devices include process variable transmitters, which measure a process variable such as pressure or temperature and communicate the measured variable to a process controller. Another type of process device is an actuator, such as a valve controller or the like. Generally, process control is accomplished using a combination of transmitters, actuators, and a process controller that communicate across a process control loop to a controller. Both types of process devices interact with the physical process through process interface elements. Process interface elements are devices which relate electrical signals to physical process conditions, and include devices such as sensors, limit switches, valve controllers, heaters, motor controllers, and a number of other devices.

The process controller is typically a microcomputer located in a control room away from the process. The process controller can receive process information from one or more process measurement devices and apply a suitable control signal to one or more process control devices to influence the process and thereby control it.

In order to couple to the process, transmitters and actuators are generally mounted near the process in the field. Such physical proximity can subject the process devices to an array of environmental challenges. For example, process devices are often subjected to temperature extremes, vibration, corrosive and/or flammable environments, and electrical noise. In order to withstand such conditions, process devices are designed specifically for "field-mounting." Such field-mounted devices utilize robust enclosures, which can be designed to be explosion-proof. Further, field-mounted process devices can also be designed with circuitry that is said to be "intrinsically safe", which means that even under fault conditions, the circuitry will generally not contain enough electrical energy to generate a spark or a surface temperature that can cause an explosion in the presence of an hazardous atmosphere. Further still, electrical isolation techniques are usually employed to reduce the effects of electrical noise. These are just a few examples of design considerations, which distinguish field-mounted process devices from other devices, which measure sensor characteristics and provide data indicative of such characteristics.

Aside from the environmental considerations listed above, another challenge for field-mounted devices is that of wiring. Since process devices are located near the process far from the control room, long wire runs are often required to couple such devices to the control room. These long runs are costly to install and difficult to maintain.

One way to reduce the requisite wiring is by using two-wire process devices. These devices couple to the control room using a two-wire process control loop. Two-wire devices receive power from the process control loop, and communicate over the process control loop in a manner that is generally unaffected by the provision of power to the process device. Techniques for communicating over two-wires include 4-20 mA signaling, the Highway Addressable Remote Transducer (HARTS) Protocol, FOUNDATION™. Fieldbus, Profibus-PA and others. Although two-wire process control systems provide wiring simplification, such systems provide a limited amount of electrical power to connected devices. For example, a device that communicates in accordance with 4-20 mA signaling must draw no more than 4 mA otherwise the devices current consumption would affect the process variable. The frugal power budget of two-wire process devices has traditionally limited the functionality that could be provided.

Another way that the process control industry has reduced field wiring and reduced the number of transmitters is by providing transmitters with multiple sensor inputs. Such transmitters reduce the number of transmitters/sensor and thereby reduce wiring costs as well as overall system costs.

One technique is to employ multiple sensors with a single transmitter. These sensors can be coupled to measurement circuitry using a multiplexer. One such transmitter is the 848T available from Rosemount Inc.

One problem associated with the use of a multiplexer to couple measurement circuitry to different sensors occurs as a result of potential differences between the sensors. Such voltage potentials may introduce errors in the measurement and damage circuitry of the transmitter.

SUMMARY

An industrial process control transmitter includes a first input configured to couple to a first sensor, and a second input configured to couple to a second sensor. Measurement circuitry is configured to couple to the first and second sensors and provide an output related to a sensed process variable. A multiplexer is configured to selectively couple the first or second sensors to the measurement circuitry. An equalizer circuit is coupled to the output of the multiplexer and configured to equalize a voltage potential on the measurement bus in order to eliminate residual voltages from the previous measurement.

DETAILED DESCRIPTION

Figure 1:
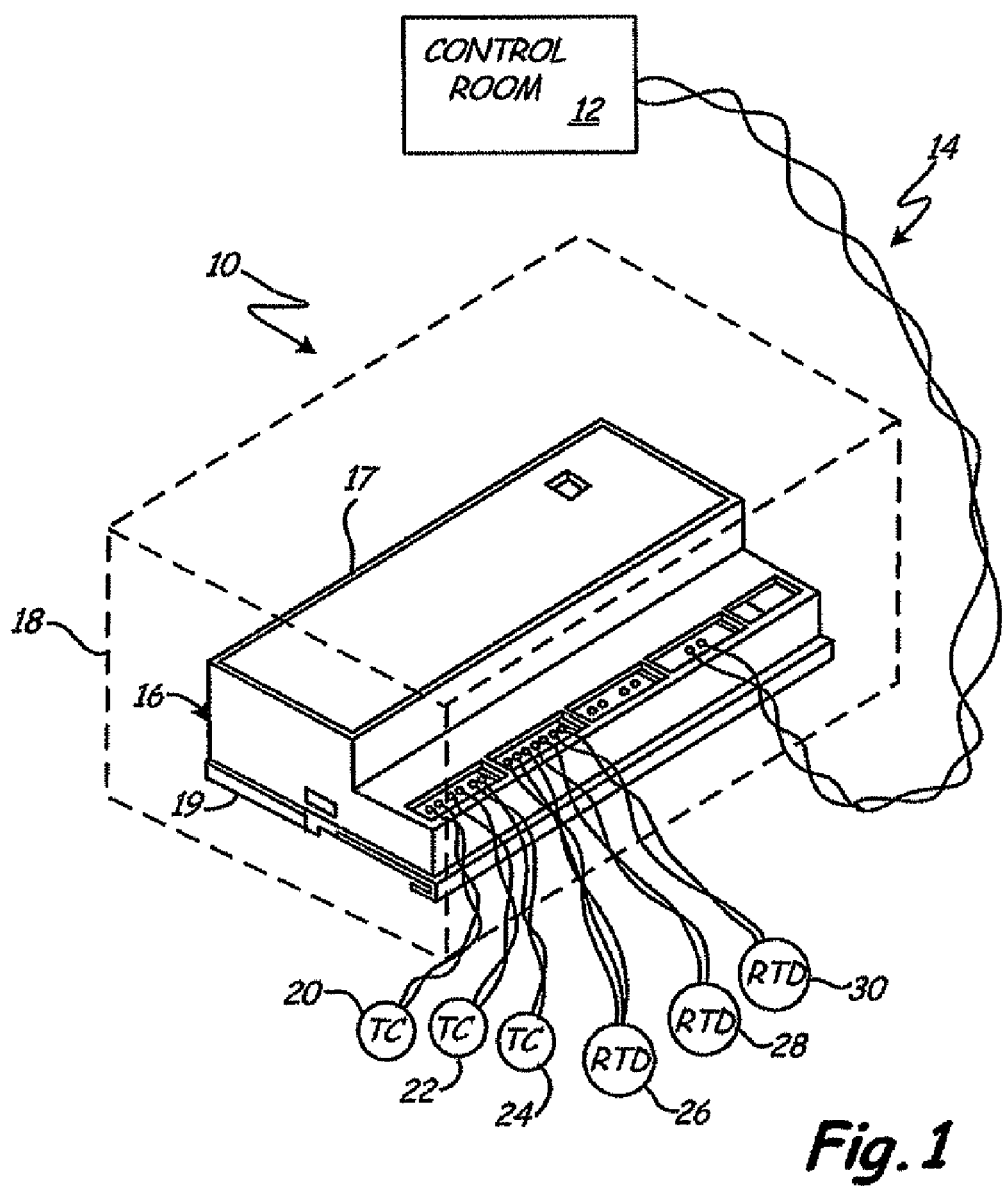
FIG. 1 is a diagrammatic view of a process control system employing a two-wire field mounted process device in accordance with an embodiment of the present invention.

An illustration field mountable process device 16 shown in FIG. 1 is provided which can be adapted to execute sophisticated user generated control algorithms, much like those used with traditional programmable logic controllers. Embodiments can include input channels, output channels, and any combination of the two. Generally, each channel is isolated from the remainder of the process device. Such isolation removes ground loop errors that can limit multiple input transmitters. Power management can be configured whereby embodiments of the present invention are wholly powered by a two-wire process loop 14. These and other features will become apparent upon review of, the figures and the related description provided below.

FIG. 1 is a diagrammatic view of process control system 10 which includes control room 12, process control loop 14 and process device 16. Process control system can comprise a single process device coupled to control room 12, however system 10 can also include hundreds of process devices coupled to one or more control rooms over a number of process control loops.

Control room 12 is typically a facility located away from device 16 that includes a microcomputer. A user stationed in control room 12 uses the microcomputer to interact with various process devices through process control loop 14 and thus controls the process(es) from the control room. For clarity, control room 12 is illustrated as a single block. However, in some control system embodiments, control room 12 may couple process control loop 14 to a global computer network, such as the internet, so that users worldwide could access process device 16 from traditional web browser software.

Loop 14 is a two-wire process control loop. A number of two-wire process communication protocols exist for communicating on loop 14, and any suitable protocol can be used. For example, the HART® protocol, the FOUNDATION™ Fieldbus protocol, and the Profibus-PA protocol can be used with embodiments of the present invention. Loop 14 provides power to connected process devices while providing communication between the various devices. The loops could include more than two wires or may operate wirelessly using RF communication.

In one embodiment, process device 16 includes cover 17 and base 19 which are preferably constructed from a suitable plastic material. As will be described in more detail, device 16 is adapted to operate solely upon electrical power received through loop 14, and is adapted for field-mounting. Optional enclosure 18 (shown in phantom) provides added durability. The process device embodiment shown in FIG. 1 has a number of inputs and outputs, and includes suitable computing circuitry (shown in FIG. 2) to execute a user generated control algorithm, if desired.

In this embodiment, process device 16 is coupled to sensors 20, 22, 24, 26, 28 and 30. Sensors 20, 22 and 24 are thermocouples, of known type, which are coupled to various process points to provide voltage signals based upon process variables at the respective process points. Resistance Temperature Devices (RTD's) 26, 28 and 30 are also coupled to various process points and provide a resistance that is based upon process temperature at the respective process points. RTD 26 is coupled to device 16 through a known three-wire connection and illustrates that various wiring configurations can be used with embodiments of the present invention.

Figure 2:
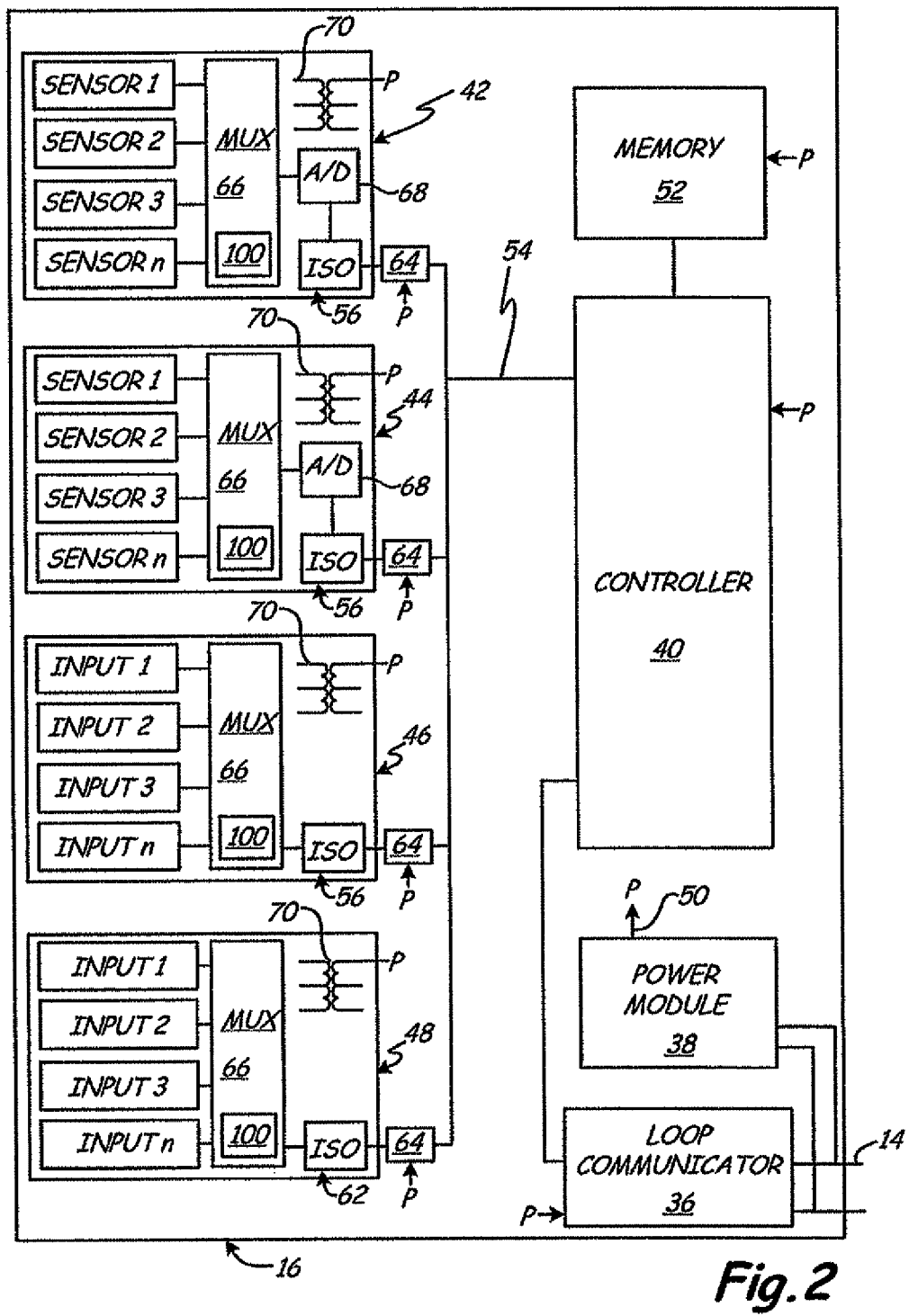
FIG. 2 is a system block diagram of the process device shown in FIG. 1.

FIG. 2 is a system block diagram of device 16 shown in FIG. 1. Device 16 includes loop communicator 36, power module 38, controller 40, and channels 42, 44, 46, 48, and memory 52. Loop communicator 36 is coupled to process control loop 14 and is adapted for bi-directional data communication over loop 14. Loop communicator 36 can include a known communication device such as a traditional FOUNDATION™ Fieldbus communication controller or the like. Power module 38 is coupled to loop 14 such that power module 38 provides power to all components of device 16 based upon power received from loop 14. Controller 40 is coupled to memory 52 and executes program instructions stored therein. Controller 40 receives power from module 38, and communicates with loop communicator 36. Controller 40 is coupled to the various channels through interface bus 54. Channels 42, 44, 46 and 48 are coupled to bus 54 through communication isolators 56, 58, 60 and 62, respectively, which are preferably known optoisolators, but which can be any suitable isolation devices such as transformers or capacitors. In some embodiments, channels 42, 44, 46 and 48 provide data in parallel form, and parallel-serial converters 64 are used to translate the data between serial and parallel forms. Preferably, converters 64 are Universal Asynchronous Receiver/Transmitters (UART's).

Channel 42 is coupled to controller 40, and includes sensor terminals 1-n, multiplexer (MUX) 66, analog-to-digital (A/D) converter 68, communication isolator 56, and power isolator 70. It is contemplated that communication isolator 56 and power isolator 70 can be combined in a single circuit. Channel 42 is specifically adapted to measure a specific sensor type such as thermocouples, resistance temperature devices, strain gauges, pressure sensors, or other sensor type. Each sensor terminal is adapted to couple a single sensor, such as a thermocouple, to multiplexer 66. Multiplexer 66 selectively couples one of the sensors to A/D converter 68 such that a characteristic of the sensor (voltage for a thermocouple) is measured and communicated to controller 40 through isolator 56 and UART 64. Power for channel 42 is received from power module 38 through power isolator 70. Power isolator 70 is preferably a transformer, but can be any suitable device. Those skilled in the art will appreciate that communication isolator 56 and power isolator 70 cooperate to ensure that channel 42 is electrically isolated from the rest of device 16.

Channel 44 is similar to channel 42, and like components are numbered similarly. Channel 44 can be configured to measure sensors of a different type than that of channel 42. For example, in one embodiment, channel 42 is configured to measure the voltage of thermocouples, and channel 44 is configured to measure the resistance of RTD's. Each sensor terminal in channel 44 is thus configured to couple to an. RTD in a two, three, or four-wire connection. Because channels 42 and 44 are each electrically isolated from the rest of device 16, coupling a first independently grounded sensor to channel 42, and a second independently grounded sensor to channel 44 does not result in the generation of undesirable ground loop errors. Additionally, since each channel can be configured for a specific type of sensor, which can be optimized for a specific application, parameters such as A/D precision and conversion rate can be tailored for the specific sensor type. For example, a channel designed for high-precision may employ an A/D converter of configured to provide a very high accuracy having a relatively slower conversion time. Conversely, a channel designed for sensors that measure a process variable that can changes quickly can employ a lower precision high speed AID converter. Essentially, any sensor input can be switched between operation with resistance-type sensors to operation with voltage-type sensors based upon configuration information received from controller 40. Controller 40 can provide the configuration information based upon information received over loop 14, or through a local input (not shown). Additionally, controller 40 can provide configuration information to the channels to adjust analog-to-digital sampling rates for each channel, or even for each sensor. This is particularly advantageous where sensor rates of change are anticipated based upon information known about the process.

Channels 46 and 48 are similar to channels 42 and 44, however they are configured to receive digital inputs and therefore do not include an analog-to-digital converter. As illustrated, inputs 1-n are coupled to multiplexer 66 which conveys the signal of a selected input to bus 54 through communication isolator 60 and UART 64. In some digital input embodiments, the input level may be such that the digital inputs could be provided directly to UART 64 through isolator 60. Digital inputs are generally indicative of logic-type signals such as contact closure in limit switches as the like. However, digital inputs 1-n can also be coupled to digital outputs of other process devices such that the inputs represent logic signals such as alarms or other Boolean type signals.

In one example configuration, the sensor-to-sensor isolation for a multi sensor device such as shown in FIGS. 1 and 2, is 0.7 volts. Any sensor-to-sensor potential above this will introduce an error to sensor measurements. Further, a sufficiently high sensor-to-sensor voltage will result in device failures. In some applications, voltages over 100 volts are required for sensor operation. The various sensors coupled to the device may themselves couple to different processes. Thus, a multiplexing scheme using high voltage switches has been used to enable sensor measurements without damage to the device.

A multiplexing device, such as multiplexor 66, uses a switch having multiple inputs to switch the various inputs to a single bus or output. This common bus then transfers the selected input to, for example, a signal conversion circuit such as analog to digital converter 68, for subsequent analysis. One artifact of the multiplexing technique is that the inputs are typically at different voltage potentials. Once a particular sensor is connected to the analog to digital conversion circuitry 68 by the multiplexor 66, the analog to digital converter 68 is raised to the voltage potential of that channel. It is preferable for sensor measurements to be made as rapidly as possible. For example, in an eight sensor device configuration, updates for each of the sensors are provided every 1.5 seconds. This means that each of the eight channels are only connected to the analog to digital converter for a fraction of a second. This time period may not be of sufficient duration for the analog to digital circuitry to accurately adjust to the potential of the sensor input prior to switching to the next sensor. This may result in inaccurate sensor measurements being returned by the device.

The time required for the voltage equalization to occur is dictated by the amount of capacitance in the analog to digital circuitry or on the sensor lines. On the various sensor inputs, there may be a number of resistors and capacitors that provide noise filtering for the sensor measurements or for other purposes. As the device uses the multiplexor to scan between the various sensor inputs and reference components, the voltage on the sensor capacitor will need to charge or discharge before an accurate measurement can be obtained. This charge must flow through the filter resistors, sensors and lead wires which, in some cases, may represent thousand of ohms of impedance. The capacitors which are used in analog to digital conversion circuitry are the components which are the primary source of these errors. The permittivity of the capacitors creates a charge trapping effect known as dielectric absorption. The extent of this effect depends on the materials used in the capacitor. The time required to naturally decay the effect to levels acceptable for a typical device may be 7 to 8 times longer than the entire eight sensor update of 1.5 seconds. Additionally, open sensors, high resistance sensor lead wires and sensor connection errors may also cause higher than normal charges on the filtering capacitors and sensor lines which further increase the time needed to equalize the voltage for subsequent measurement. If the measurement is taken prior to this equalization, a significant measurement error will be introduced.

These types of errors can occur simply due to the different sensor types being monitored. For example, a full scale ohmic type sensor can elevate the signal measurement circuitry to 400 mV above the voltage reference on the circuit board. However, a typical accuracy specification for a device may be 50 µV, i.e., 8000 times smaller than 400 mV. In another example, some diagnostics techniques may cause the measurement bus and sensor lines to be elevated 3.5 volts above the circuit voltage reference.

The present invention presents a solution to the above problem. The present invention includes an equalization circuit, such as circuit 100 shown in FIG. 2, which is used to allow the device to accurately measure multiple sensor inputs with a multiplexing architecture. During sensor reading, the multiplexor bus is momentarily connected to a circuit voltage reference. This momentary connection "equalizes" the channel by bringing the connected input channel and the signal conversion circuitry to a common voltage potential. Once the components are at the same voltage potential, accurate circuit measurements can be taken.

Figure 3:
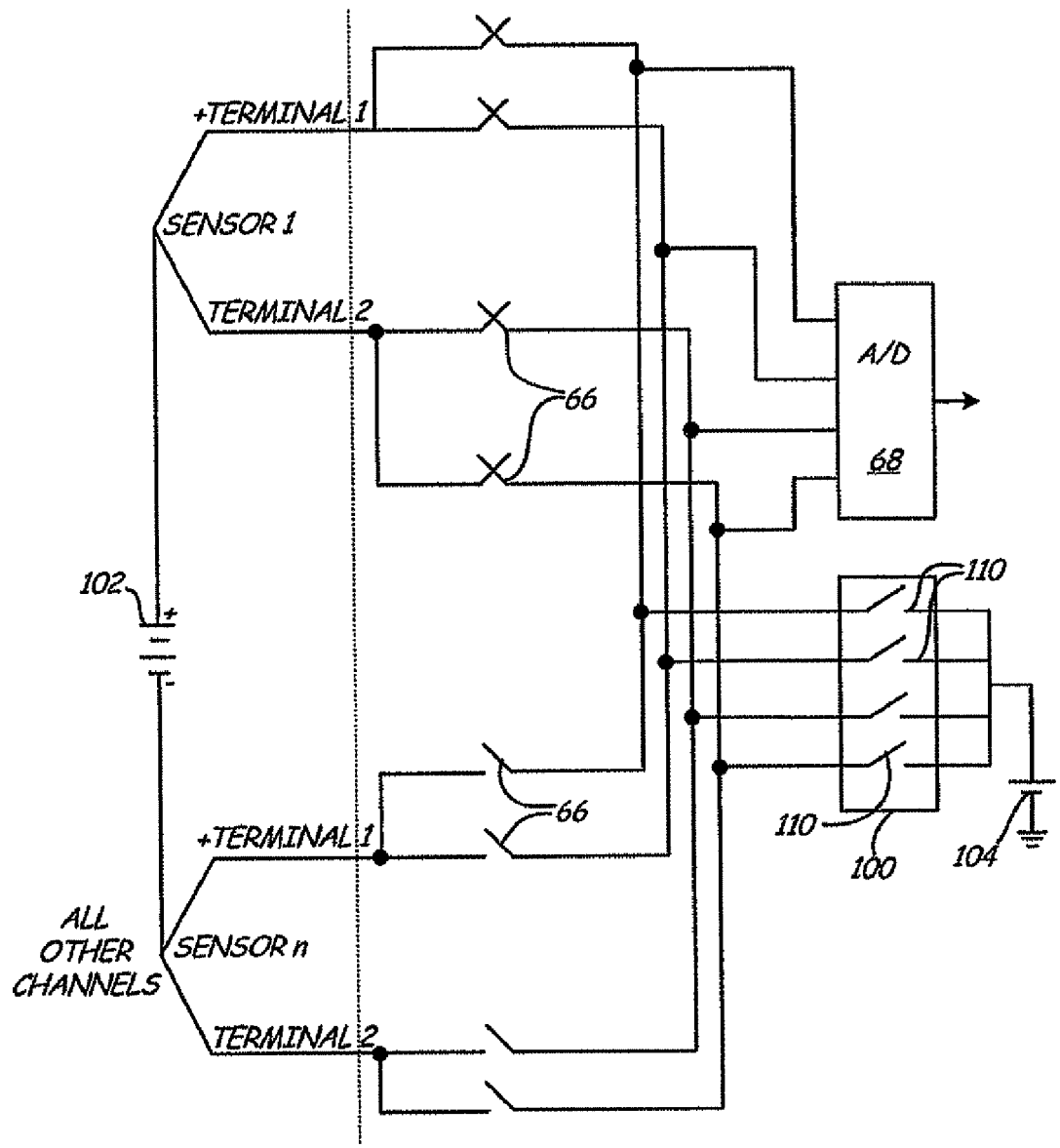
FIG. 3 is a simplified block diagram showing equalization circuitry of the present invention.

FIG. 3 is a simplified block diagram showing operation of the equalization circuitry 100 shown in greater detail. FIG. 3 shows two sensors although any number may be employed. In FIG. 3, multiplexor 66 is illustrated as individual switches. The crossed switches 66 indicates a close condition of the multiplexor while the open switches indicate an open condition. In the example of FIG. 3, sensor 1 is coupled to the analog to digital converter 68 by the multiplexor 66. A voltage potential 102 is illustrated schematically and comprises the potential difference between the measured channel (from sensor 1) and the other sensor channels. Prior to a sensor measurement reading, the bus of multiplexor 66 is momentarily connected to the circuit voltage reference potential 104. This equalizes the input channel and the signal conversion circuitry by bringing the two components to a common voltage potential as determined by the reference voltage 104. Once the components are at the same potential, the voltage potential 104 is removed and accurate measurements obtained using the analog to digital conversion circuit 68.

In this example, the equalization circuit 100 comprises a plurality of switches 110. As illustrated, these switches 110 can be used to selectively couple the various input channels to the voltage reference 104. The operation of switches 110 can be controlled, for example, by controller 40, which also can be configured to control multiplexer 66.

In one example configuration, the voltage reference 104 is 1.225 volts. However, this can be changed as desired with respect to ground. The reference voltage typically has a value which is close to the sensor and reference component measurement voltages. In such a configuration, the time needed to charge or discharge the filter capacitors on subsequent measurements is reduced and the accuracy of the measurement increased. In one example, the time required to equalize the components is 16 mS. This can be, for example, based upon a clock cycle used to operate the controller 40.

In various embodiments, the use of equalization circuitry 100 may be selective. For example, if a sensor to be measured is similar to the previously measured sensor, the equalization step can be eliminated or its duration shortened. The technique can be employed with any type of sensor measurement which measures multiple sensor values. For example, some applications require multiple temperature measurements from a single device. These measurements share a common set of filter capacitors having a potential change which depends on the measurement being conducted. The equalization circuitry 100 of the present invention can be utilized to mitigate measurement errors due to the measurement sequencing and thereby increase the accuracy of the temperature measurement.

Although the present invention has been described with reference to preferred embodiments, workers skilled in the art will recognize that changes may be made in form and detail without departing from the spirit and scope of the invention. The present invention can be implemented in the device and can be coupled to a process control loop. The process control loop can be a two wire process control loop in which a current level between 4-20 mA signal represent a measured value, or can comprise process control loops which carry digital information, for example superimposed on a 4-20 mA current level. In another example configuration, the process control loop comprises a wireless process control loop in which information is transferred wirelessly to a different location. As used herein, "equalize" refers to reducing a voltage potential between two points in order to improve the accuracy of a sensor measurement.

What is claimed is:

1. An industrial process control transmitter, comprising:
   a first input configured to couple to a first sensor;
   a second input configured to couple to a second sensor;
   measurement circuitry configured to couple to the first and second sensors and provide an output related to a sensed process variable;
   a multiplexer configured to selectively couple the first and second sensors to the measurement circuitry; and
   an equalizer circuit coupled to the first and second sensors configured to equalize a voltage potential between the first sensor and the measurement circuitry.

2. The apparatus of claim 1 wherein the measurement circuit includes a voltage reference to which the voltage potential is equalized.

3. The apparatus of claim 2 wherein the equalizer circuit selectively couples the first input and the multiplexer to the reference voltage.

4. The apparatus of claim 3 wherein the equalizer circuit is further configured to selectively connect the second input to the equalizer circuit.

5. The apparatus of claim 1 including an analog to digital converter coupled to the multiplexer and configured to digitize a voltage level from the first or second inputs.

6. The apparatus of claim 1 wherein the first input comprises a first connection to a first terminal of the first sensor and a second connection to a second terminal of the first sensor.

7. The apparatus of claim 6 wherein the first input further comprises a third connection to the first terminal and a fourth connection to the second terminal.

8. The apparatus of claim 7 wherein the first, second, third and fourth connections couple to the equalizer circuit.

9. The apparatus of claim 8 wherein the first, second, third and fourth connections couple to switches of the equalizer circuit arranged to selectively couple the connections to a reference voltage.

10. The apparatus of claim 1 including communication circuitry configured to provide an output on a process control loop.

11. The apparatus of claim 10 wherein the process control loop comprises a two wire process control loop.

12. The apparatus of claim 10 wherein the process control loop comprises a wireless process control loop.

13. A method of measuring sensor values from first and second sensors in an industrial process control transmitter, comprising:
    coupling a first sensor to measurement circuitry;
    measuring a value of the first sensor using the measurement circuitry;
    disconnecting the measurement circuitry from the first sensor;
    coupling the measurement circuitry to a reference potential;
    disconnecting the measurement circuitry from the reference potential; and
    measuring a value of the second sensor using the measurement circuitry.

14. The method of claim 13 including coupling the second sensor and the measurement circuitry to a voltage reference.

15. The method of claim 14 including digitizing a voltage of the second sensor.

16. The method of claim 13 wherein the first sensor include a first terminal and a second terminal.

17. The method of claim 16 wherein the first input further comprises a third connection to the first terminal and a fourth connection to the second terminal.

18. The method of claim 13 includes coupling the first sensor to the reference potential.

19. The method of claim 13 including communicating the measured value over a process control loop.

20. The method of claim 19 wherein the process control loop comprises a two wire process control loop.

21. The method of claim 19 wherein the process control loop comprises a wireless process control loop.

22. The method of claim 13 including coupling the second sensor to a reference potential.

23. The method of claim 22 including disconnecting the second sensor from the reference potential.

24. An apparatus for measuring sensor values from first and second sensors in an industrial process control transmitter, comprising:
    means for coupling a first sensor to measurement circuitry;
    means for measuring a value of the first sensor using the measurement circuitry;
    means for disconnecting the measurement circuitry from the first sensor;
    means for coupling the measurement circuitry to a reference potential;
    means for disconnecting the measurement circuitry from the reference potential; and
    means for measuring a value of the second sensor using the measurement circuitry.

* * * * *